(12) United States Patent
Kawamoto

(10) Patent No.: US 12,460,374 B2
(45) Date of Patent: Nov. 4, 2025

(54) ROTARY CONSTRUCTION MACHINE

(71) Applicant: KOBELCO CONSTRUCTION MACHINERY CO., LTD., Hiroshima (JP)

(72) Inventor: Masahiro Kawamoto, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 395 days.

(21) Appl. No.: 18/000,882

(22) PCT Filed: Jun. 2, 2021

(86) PCT No.: PCT/JP2021/021057
§ 371 (c)(1),
(2) Date: Dec. 6, 2022

(87) PCT Pub. No.: WO2021/251244
PCT Pub. Date: Dec. 16, 2021

(65) Prior Publication Data
US 2023/0212835 A1   Jul. 6, 2023

(30) Foreign Application Priority Data
Jun. 9, 2020 (JP) .................................. 2020-100378

(51) Int. Cl.
*E02F 3/43* (2006.01)
*E02F 3/42* (2006.01)
(Continued)

(52) U.S. Cl.
CPC .............. *E02F 3/435* (2013.01); *E02F 3/425* (2013.01); *E02F 9/123* (2013.01); *E02F 9/2228* (2013.01);
(Continued)

(58) Field of Classification Search
CPC . E02F 3/425; E02F 3/435; E02F 3/963; E02F 9/123; E02F 9/2228; E02F 9/2235;
(Continued)

(56) References Cited

U.S. PATENT DOCUMENTS 10,400,797 B2 * 9/2019 Udagawa ................ F15B 11/02
2005/0060993 A1   3/2005 Oka et al.
(Continued)

FOREIGN PATENT DOCUMENTS

CN    106062386 A    10/2016
EP    2 803 770 A1   11/2014
(Continued)

OTHER PUBLICATIONS

Extended European Search Report issued Oct. 5, 2023 in European Patent Application No. 21821312.2, 8 pages.
(Continued)

*Primary Examiner* — Saul Rodriguez
*Assistant Examiner* — Brendan P Tighe
(74) *Attorney, Agent, or Firm* — Oblon, McClelland, Maier & Neustadt, L.L.P.

(57) ABSTRACT

A confluence control part of a slewing-type construction machine controls a confluence switch valve such that the confluence switch valve is switched to a suspension state when a slewing and boom raising manipulation action is performed. A pump capacity control part of the slewing-type construction machine executes a capacity control when the slewing and boom raising manipulation action is performed, the capacity control including regulating a first pump capacity and a second pump capacity respectively in such a manner that the first pump capacity increases and the second pump capacity decreases as an operating pressure difference resulting from the subtraction of a slewing operating pressure from a boom operating pressure increases, and the first
(Continued)

pump capacity decreases and the second pump capacity increases as the operating pressure difference decreases.

5 Claims, 8 Drawing Sheets

(51) Int. Cl.
| | | |
|---|---|---|
| *E02F 9/12* | (2006.01) | |
| *E02F 9/22* | (2006.01) | |
| *E02F 9/26* | (2006.01) | |
| *F15B 11/17* | (2006.01) | |
| *E02F 3/96* | (2006.01) | |

(52) U.S. Cl.
CPC .......... *E02F 9/2235* (2013.01); *E02F 9/2292* (2013.01); *E02F 9/2296* (2013.01); *E02F 9/26* (2013.01); *F15B 11/17* (2013.01); *E02F 3/963* (2013.01); *E02F 9/2285* (2013.01)

(58) Field of Classification Search
CPC ..... E02F 9/2285; E02F 9/2292; E02F 9/2296; E02F 9/26; F15B 11/17
See application file for complete search history.

(56) References Cited

U.S. PATENT DOCUMENTS

| | | | |
|---|---|---|---|
| 2006/0130473 A1 | 6/2006 | Kim | |
| 2014/0245729 A1* | 9/2014 | Nanjo | E02F 9/2091 60/459 |
| 2015/0044007 A1* | 2/2015 | Tajima | F15B 11/17 414/685 |
| 2015/0184362 A1* | 7/2015 | Komiyama | E02F 9/2095 414/744.2 |
| 2018/0058042 A1 | 3/2018 | Moriki et al. | |
| 2018/0073217 A1 | 3/2018 | Joung et al. | |
| 2018/0073525 A1* | 3/2018 | Udagawa | E02F 9/2296 |
| 2020/0354926 A1* | 11/2020 | Ueda | E02F 9/2235 |
| 2020/0362538 A1* | 11/2020 | Kozui | E02F 9/128 |
| 2020/0370279 A1* | 11/2020 | Kozui | E02F 9/2228 |

FOREIGN PATENT DOCUMENTS

| | | | |
|---|---|---|---|
| JP | 62-253825 A | 11/1987 | |
| JP | 2005-83427 A | 3/2005 | |
| JP | 2014-31827 A | 2/2014 | |
| JP | 2016-61387 A | 4/2016 | |
| JP | 2016-145604 A | 8/2016 | |
| JP | 2019-127687 A | 8/2019 | |
| JP | 2019-138064 A | 8/2019 | |
| JP | 2019137977 A * | 8/2019 | |
| WO | WO 2011/114930 A1 | 9/2011 | |
| WO | WO 2017/051483 A1 | 3/2017 | |
| WO | WO-2019159495 A1 * | 8/2019 | .............. E02F 9/123 |

OTHER PUBLICATIONS

International Search Report Issued Aug. 17, 2021, in PCT/JP2021/021057, filed on Jun. 2, 2021, 3 pages.

Combined Chinese Office Action and Search Report issued Mar. 29, 2024 in Chinese Patent Application No. 202180039962.6 (with English summary), 9 pages.

* cited by examiner

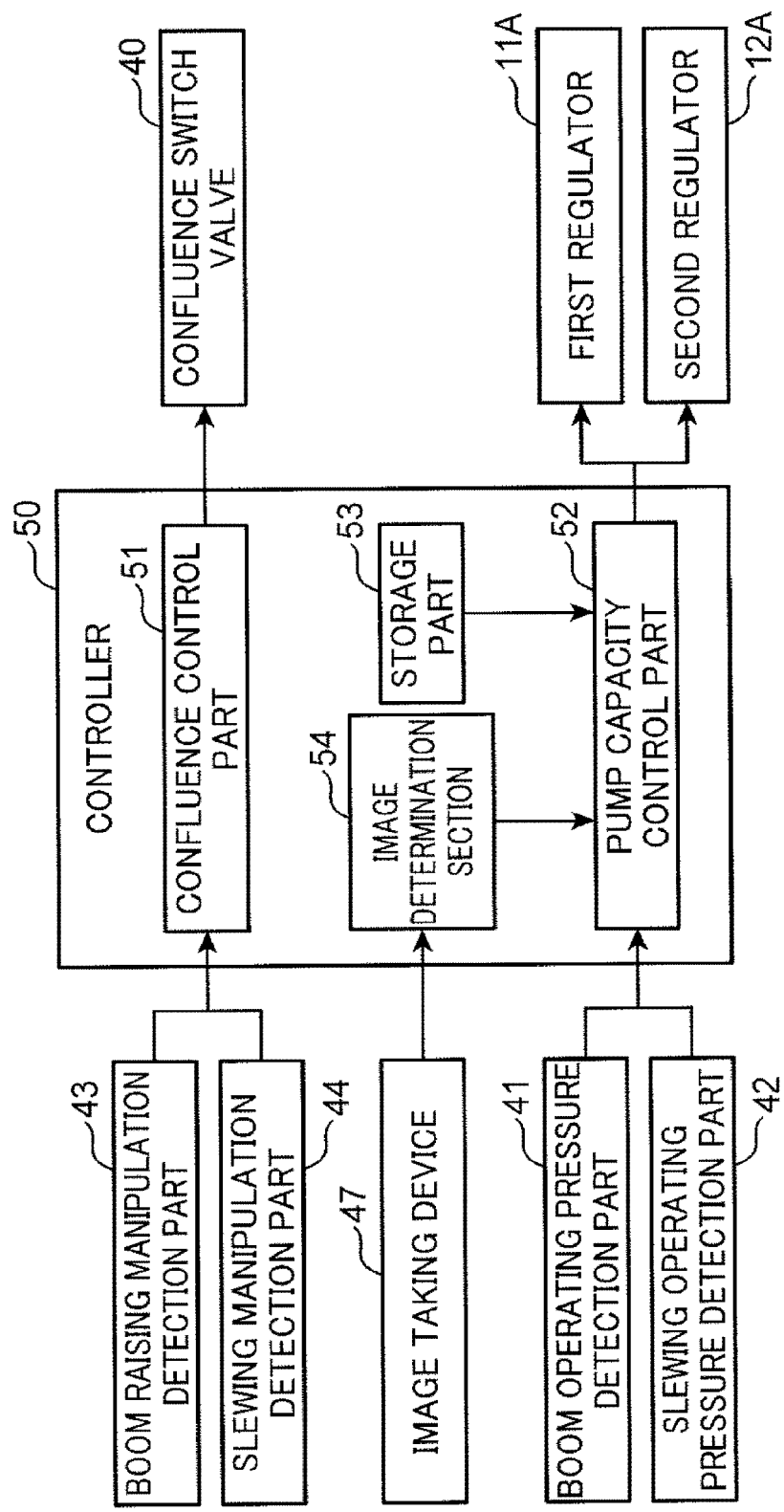

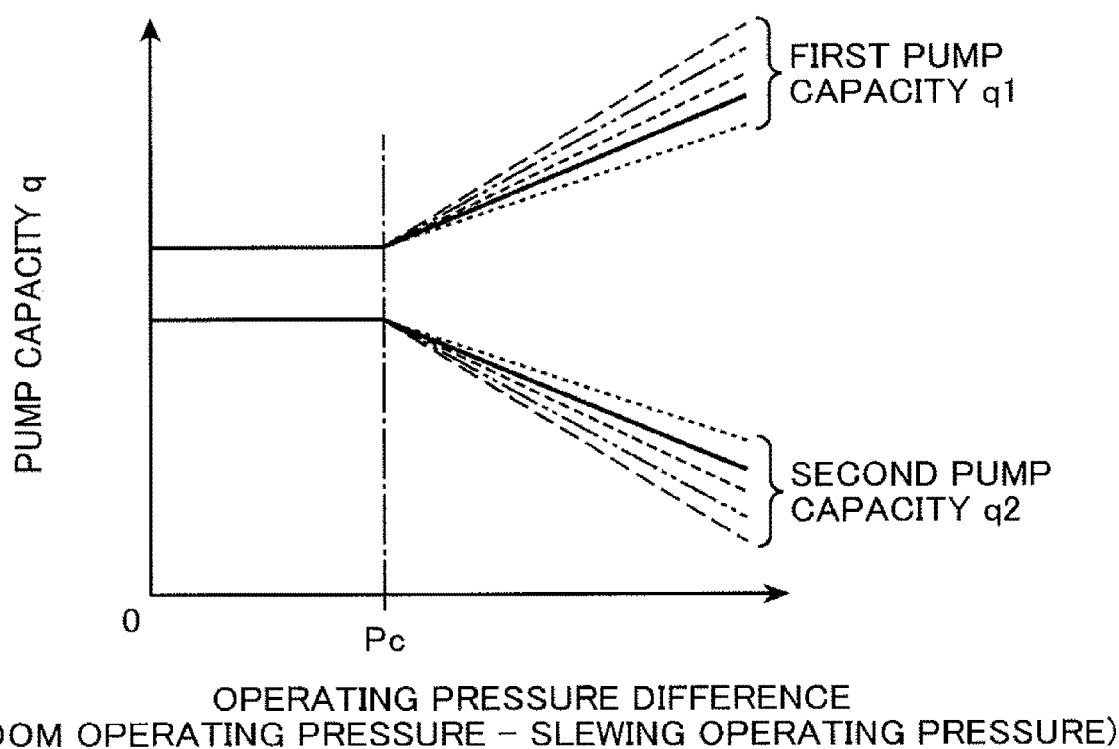

ROTARY CONSTRUCTION MACHINE

TECHNICAL FIELD

The present invention relates to a slewing-type construction machine such as a hydraulic excavator.

BACKGROUND ART

For example, as disclosed in Patent Literature 1, a slewing-type construction machine such as a hydraulic excavator generally includes a lower travelling body, an upper slewing body slewably mounted on the lower travelling body, a working device including a boom tiltably connected to the upper slewing body, a boom cylinder receiving a supply of hydraulic oil discharged from a first hydraulic pump to raise and lower the boom, a slewing motor receiving a supply of the hydraulic fluid discharged from a second hydraulic pump to slew the upper slewing body, and a confluence switch valve (a boom-accelerating control valve) permitting a confluence of a part of the hydraulic fluid discharged from the second pump with the hydraulic fluid supplied from the first hydraulic pump to the boom cylinder to thereby accelerate the boom raising operation.

In the construction machine of Patent Literature 1, the confluence switch valve is switched to permit a confluence of a part of the hydraulic fluid discharged from the second pump with the hydraulic fluid supplied from the first hydraulic pump to the boom cylinder when a slewing and boom raising manipulation action is performed, the slewing and boom raising manipulation action including the slewing manipulation and the boom raising manipulation.

In a hydraulic control circuit in a construction machine of Patent Literature 2, when boom raising detection means and slewing detection means detect a combined operation of the boom raising and slewing, a flow rate distribution control part controls a regulator so that a first pump has a discharge flow rate higher than a second pump at a start of the combined operation, and controls the regulator so as to reduce a discharge flow difference as a difference between the respective pump discharge pressures detected by first pump pressure detection means and second pump pressure detection means increases after the slewing becomes steady.

Generally, the working device in the slewing-type construction machine as described above includes a leading end attachment that is selected from a plurality of leading end attachments that are a bucket, a grapple, a crusher, a breaker, a fork, and the like. Specifically, the leading end attachments are configured to be replaceable with one another according to the work content.

The conventional slewing-type construction machine as described above involves a problem that replacement of a leading end attachment of the working device with another leading end attachment having a weight different from that of the former leading end attachment changes the weight of the working device, and consequently leads to an unbalance between the operation of the boom cylinder and the operation of the slewing motor when the slewing and boom raising manipulation action is performed. A specific explanation will be made below.

For example, when a leading end attachment of the working device is replaced with another leading end attachment having a weight higher than that of the former leading end attachment, the weight of the working device increases, and then the operating pressure of the boom cylinder rises compared with that before the replacement of the leading end attachment. As a result, when the slewing and boom raising manipulation action is performed, the operating pressure of the slewing motor rises as well. When the operating pressure of the slewing motor rises, the acceleration rate of the slewing motor rises. Specifically, in the conventional slewing-type construction machine, when the slewing and boom raising manipulation action is performed, the operation of the slewing motor is considerably affected by the operating pressure rise in the boom cylinder that is caused by an increase in the weight of the working device.

CITATION LIST

Patent Literature

Patent Literature 1: Japanese Unexamined Patent Publication No. SHO 62-253825
Patent Literature 2: Japanese Unexamined Patent Publication No. 2005-83427

SUMMARY OF INVENTION

An object of the present invention is to provide a slewing-type construction machine that can keep the balance between an operation of a slewing motor and an operation of a boom cylinder from changing when a slewing and boom raising manipulation action is performed, irrespective of a change in the weight of a working device caused by a replacement of a leading end attachment.

A slewing-type construction machine to be provided includes: a base body; an upper slewing body slewably mounted on the base body; a working device including a boom tiltably connected to the upper slewing body, and a leading end attachment that is selected from a plurality of leading end attachments having different weights from one another; a first hydraulic pump having a variable capacity for discharging hydraulic fluid; a second hydraulic pump having a variable capacity for discharging hydraulic fluid; a boom cylinder receiving a supply of the hydraulic fluid discharged from the first hydraulic pump to raise and lower the boom; a boom control device, in response to a boom raising manipulation causing the boom to move in a rising direction, controlling a flow rate of the hydraulic fluid supplied from the first hydraulic pump to the boom cylinder; a slewing motor receiving a supply of the hydraulic fluid discharged from the second hydraulic pump to slew the upper slewing body; a slewing control device, in response to a slewing manipulation causing the upper slewing body to slew, controlling a direction and a flow rate of the hydraulic fluid supplied from the second hydraulic pump to the slewing motor; a confluence switch valve switchable between a permission state of permitting a confluence of at least a part of the hydraulic fluid discharged from the second hydraulic pump with the hydraulic fluid supplied from the first hydraulic pump to the boom cylinder and a suspension state of suspending the confluence of the hydraulic fluid; a boom operating pressure detection part for detecting a boom operating pressure corresponding to an operating pressure of the boom cylinder; a slewing operating pressure detection part for detecting a slewing operating pressure corresponding to an operating pressure of the slewing motor; a confluence control part for controlling the confluence switch valve to be in the permission state when a non-slewing and boom raising manipulation action in which the boom raising manipulation is applied to the boom control device and the slewing manipulation is not applied to the slewing control device is performed, and controlling the confluence switch valve to be in the suspension state when a slewing and boom raising manipulation action in which the boom raising manipulation is applied to the boom control device and the slewing manipulation is concurrently applied to the slewing control device is performed; and a pump capacity control part for executing a capacity control when the slewing and boom raising manipulation action is performed, the capacity control including a control of regulating a first pump capacity meaning a pump capacity of the first hydraulic pump and a second pump capacity meaning a pump capacity of the second hydraulic pump respectively in such a manner that the first pump capacity increases and the second pump capacity decreases as an operating pressure difference resulting from the subtraction of the slewing operating pressure from the boom operating pressure increases, and a control of regulating the first pump capacity and the second pump capacity respectively in such a manner that the first pump capacity decreases and the second pump capacity increases as the operating pressure difference decreases.

BRIEF DESCRIPTION OF DRAWINGS

FIG. 7 is a block diagram showing a configuration of a controller connected to a hydraulic circuit in a slewing-type construction machine which is a modification of the embodiment.

FIG. 8 is a graph showing another exemplary map stored in a storage part of the controller in the modification.

DESCRIPTION OF EMBODIMENTS

Figure 1:
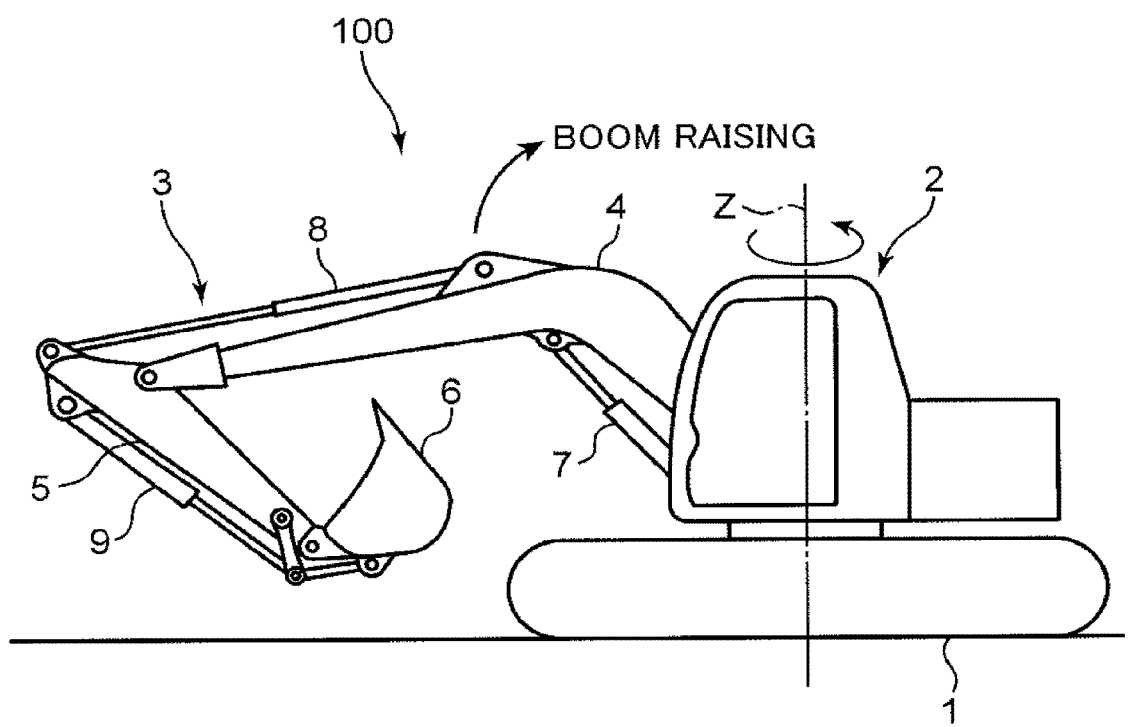
FIG. 1 is a side view showing a slewing-type construction machine according to an embodiment, the slewing-type construction machine including a bucket as a leading end attachment.

Hereinafter, an embodiment of the present invention will be described with reference to the drawings. FIG. 1 is a side view showing a hydraulic excavator 100, which is an exemplary slewing-type construction machine according to the embodiment.

The hydraulic excavator 100 includes a lower travelling body 1 capable of travelling on the ground, an upper slewing body 2 mounted on the lower travelling body 1 slewably about a vertical axis Z, and a working device 3 mounted on the upper slewing body 2. A front portion of the upper slewing body 2 in a front-rear direction is provided with a cab serving as an operating room, and is mounted with the working device 3, whereas a rear portion is provided with an engine room and is mounted with a counterweight.

The working device 3 includes a boom 4, an arm 5, and a leading end attachment that is selected from a plurality of leading end attachments. The hydraulic excavator 100 further includes a boom cylinder 7, an arm cylinder 8, and a leading end attachment cylinder 9.

The boom 4 includes a base end portion supported at a front end of the upper slewing body 2 tiltably, i.e., swingably in an upper and lower direction about a horizontal axis, and a leading end portion on the opposite thereto. The arm 5 includes a base end portion connected to the leading end portion of the boom 4 swingably about the horizontal axis, and a leading end portion on the opposite thereto.

Figure 2:
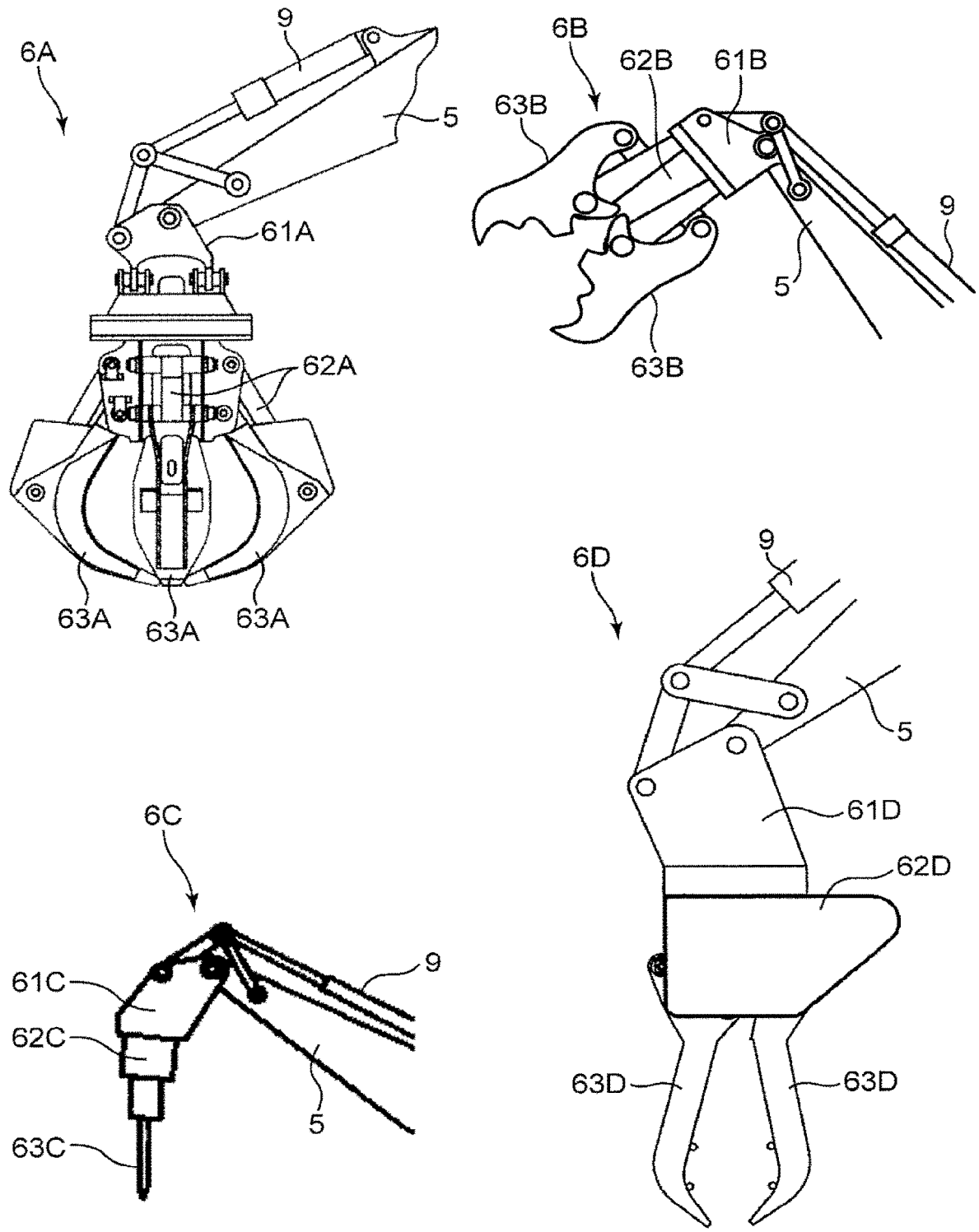
FIG. 2 shows other exemplary leading end attachments.

The leading end attachments include, for example, a bucket 6 shown in FIG. 1, and a grapple 6A, a crusher 6B, a breaker 6C, and a fork 6D that are shown in FIG. 2. The leading end attachments 6, 6A, 6B, 6C, and 6D are configured to be replaceable with one another, and one of the leading end attachments 6, GA, 6B, 6C, and 6D is selectively included in the working device 3. Since the leading end attachments 6, 6A, 6B, 6C, and 6D are used for work purposes different from one another, the respective configurations are greatly different, and their respective weights are thus different from one another.

The bucket 6 shown in FIG. 1 is a leading end attachment adapted for performing, for example, an excavation work in a work site. The bucket 6 is swingably attached to the leading end portion of the arm 5.

The grapple 6A shown in FIG. 2 is a leading end attachment adapted for gripping and transporting scrap in a scrapyard and the like, for example. The grapple 6A has a bracket 61A attached to the leading end portion of the arm 5, a grapple main body 62A supported by the bracket 61A, and a plurality of claws 63A (four claws 63A in FIG. 2) supported by the grapple main body 62A.

The crusher 6B is a leading end attachment adapted for performing a demolishing work of a concrete building and the like, for example. The crusher 6B has a bracket 61B attached to the leading end portion of the arm 5, a crusher main body 62B supported by the bracket 61B, and a pair of crushing arms 63B supported by the crusher main body 62B.

The breaker 6C is a leading end attachment adapted for excavating bedrock, splitting rock, and crushing concrete, and the like, for example. The breaker 6C has a bracket 61C attached to the leading end portion of the arm 5, a breaker main body 62C supported by the bracket 61C, and a chisel 63C that is supported by the breaker main body 62C and is reciprocable in the axial directions thereof.

The fork 6D is a leading end attachment adapted for gripping an object to be transported, for example. The fork 6D has a bracket 61D attached to the leading end portion of the arm 5, a fork main body 62D supported by the bracket 61D, and a pair of opening and closing arms 63D supported by the fork main body 62D.

Figure 3:
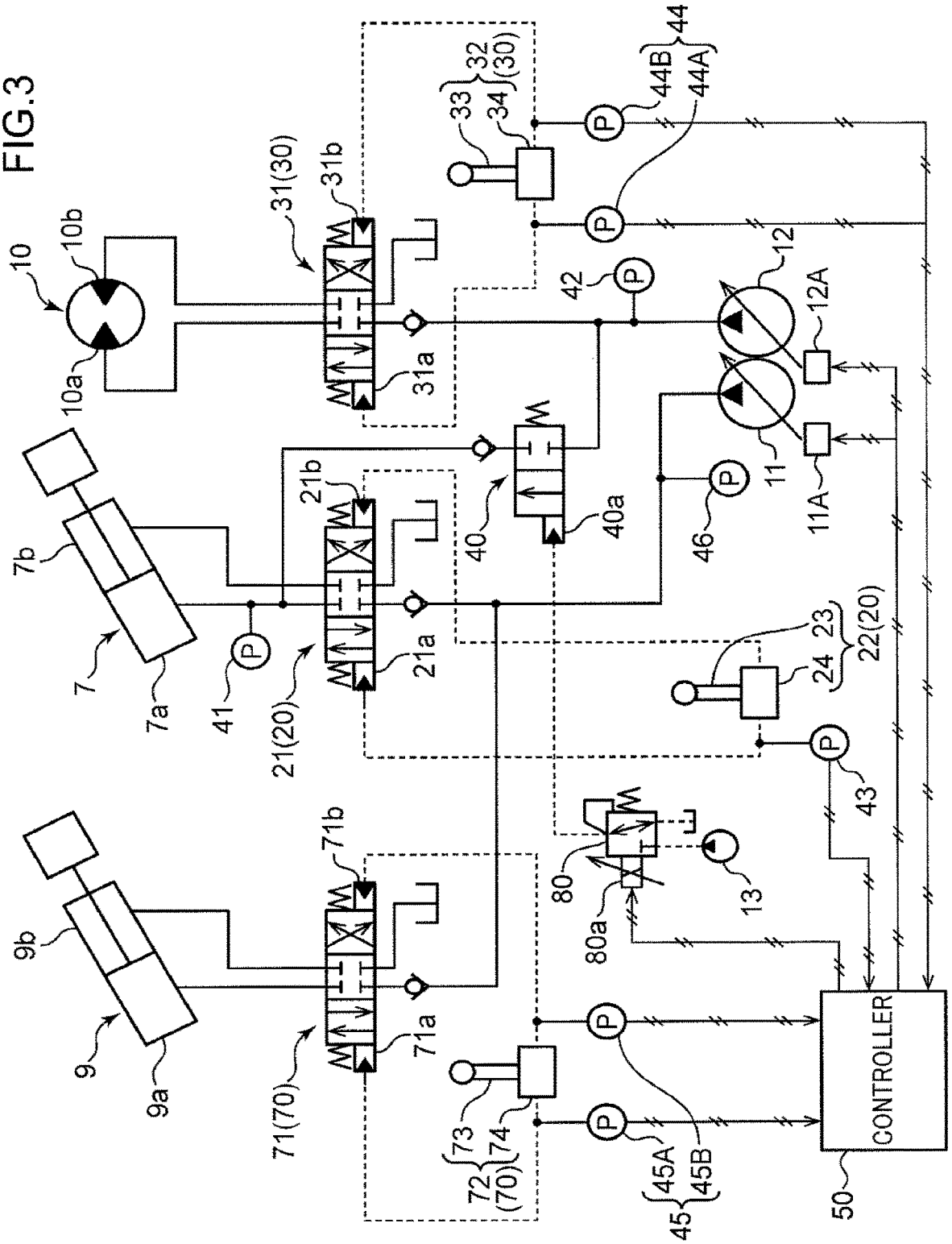
FIG. 3 is a diagram showing a hydraulic circuit included in the slewing-type construction machine.
Figure 4:
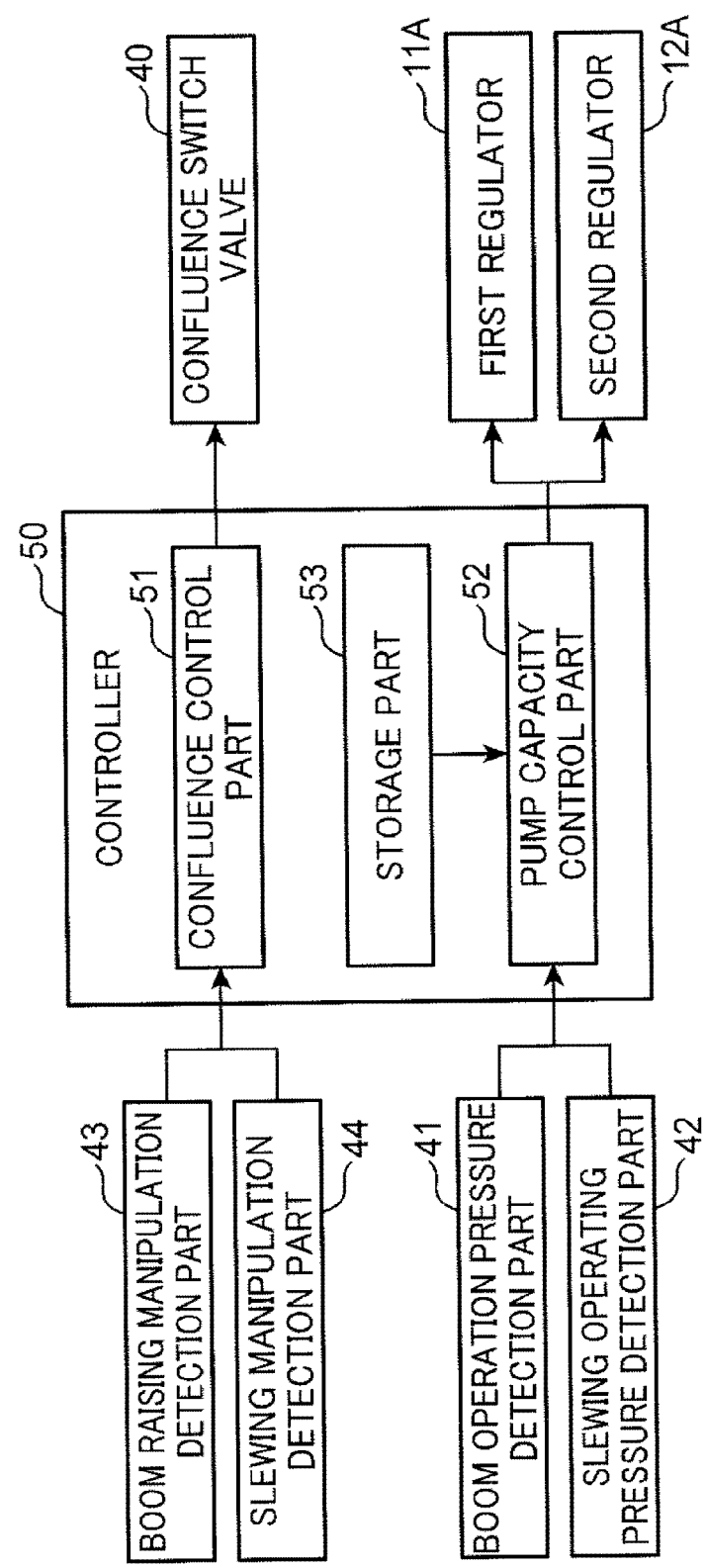
FIG. 4 is a block diagram showing a configuration of a controller connected to the hydraulic circuit.

FIG. 3 is a diagram showing a hydraulic circuit included in the hydraulic excavator 100. FIG. 4 is a block diagram showing a configuration of a controller 50 connected to the hydraulic circuit. As shown in FIGS. 3 and 4, the hydraulic excavator 100 includes a first hydraulic pump 11, a second hydraulic pump 12, a pilot pump 13, a first regulator 11A, a second regulator 12A, a boom control device 20, a slewing motor 10, a slewing control device 30, a confluence switch valve 40, a confluence pilot valve 80, an arm control device, a leading end attachment control device 70, a boom operating pressure detection part 41, a slewing operating pressure detection part 42, a boom raising manipulation detection part 43, a slewing manipulation detection part 44, a leading end attachment manipulation detection part 45, and a controller 50.

Each of the first hydraulic pump 11 and the second hydraulic pump 12 is a variable capacity hydraulic pump, in which the pump capacity is regulable. The first regulator 11A regulates, in response to an input of a capacity instruction signal that is an electric signal from the controller 50, a first pump capacity meaning a pump capacity of the first hydraulic pump 11 to a capacity corresponding to the capacity instruction signal. Similarly, the second regulator 12A regulates, in response to an input of a capacity instruction signal that is an electric signal from the controller 50, a second pump capacity meaning a pump capacity of the second hydraulic pump 12 to a capacity corresponding to the capacity instruction signal. The first hydraulic pump 11, the second hydraulic pump 12, and the pilot pump 13 are driven by an unillustrated engine to thereby respectively discharge the hydraulic fluid in a tank.

The boom cylinder 7 is a hydraulic actuator that operates to raise and lower the boom 4 upon receiving a supply of hydraulic fluid discharged from the first hydraulic pump 11. The boom cylinder 7 has a bottom chamber 7a and a rod chamber 7b on the opposite thereto. The boom cylinder 7 extends upon a supply of the hydraulic fluid to the bottom chamber 7a to move the boom 4 in the boom raising direction, and concurrently discharge the hydraulic fluid from the rod chamber 7b. Conversely, the boom cylinder 7 retracts upon a supply of the hydraulic fluid to the rod chamber 7b to move the boom 4 in a boom lowering direction, and concurrently discharge the hydraulic fluid from the bottom chamber 7a.

The boom control device 20 controls, in response to either a boom raising manipulation causing the boom 4 to move in a rising direction or a boom lowering manipulation operation causing the boom 4 to move in a lowering direction, a direction and a flow rate of the hydraulic fluid supplied from the first hydraulic pump 11 to the boom cylinder 7. The boom control device 20 includes a boom control valve 21 and a boom manipulating device 22.

The boom control valve 21 is arranged between the first hydraulic pump 11 and the boom cylinder 7, and is opened and closed in such a manner as to change the direction and the flow rate of the hydraulic fluid supplied from the first hydraulic pump 11 to the boom cylinder 7. Specifically, the boom control valve 21 includes a pilot-operated three-position directional switch valve including a boom raising pilot port 21a and a boom lowering pilot port 21b.

When no pilot pressure is input to either the boom raising pilot port 21a or the boom lowering pilot port 21b, the boom control valve 21 is kept at a neutral position, and blocks the flow of the hydraulic fluid in a fluid passage between the first hydraulic pump 11 and the boom cylinder 7. The fluid passage between the first hydraulic pump 11 and the boom control valve 21 is provided with an unillustrated relief valve.

When a boom raising pilot pressure is input to the boom raising pilot port 21a, the boom control valve 21 shifts from the neutral position to a boom raising position in a stroke commensurate with a magnitude of the boom raising pilot pressure. The valve is thus opened in such a manner as to permit the supply of the hydraulic fluid from the first hydraulic pump 11 to the bottom chamber 7a of the boom cylinder 7 at a flow rate corresponding to the stroke, and the discharge of the hydraulic fluid from the rod chamber 7b of the boom cylinder 7. This drives the boom cylinder 7 in the boom raising direction at a speed corresponding to the boom raising pilot pressure.

When a boom lowering pilot pressure is input to the boom lowering pilot port 21b, the boom control valve 21 shifts from the neutral position to a boom lowering position in a stroke commensurate with a magnitude of the boom lowering pilot pressure. The valve is thus opened in such a manner as to permit the supply of the hydraulic fluid from the first hydraulic pump 11 to the rod chamber 7b of the boom cylinder 7 at a flow rate corresponding to the stroke, and the discharge of the hydraulic fluid from the bottom chamber 7a of the boom cylinder 7. This drives the boom cylinder 7 in the boom lowering direction at a speed corresponding to the boom lowering pilot pressure.

The boom manipulating device 22 operates, in response to either the boom raising manipulation causing the boom 4 to move in the rising direction or the boom lowering manipulation causing the boom 4 to move in the lowering direction, in such a manner as to permit the input of the pilot pressure corresponding to the manipulation from the pilot pump 13 to the boom control valve 21.

Specifically, the boom manipulating device 22 includes a boom manipulating lever 23 and a boom remote control valve 24.

The boom manipulating lever 23 is a member rotatable in response to either the boom raising manipulation or the boom lowering manipulation by an operator. The boom raising manipulation and the boom lowering manipulation cause the boom manipulating lever 23 to rotate in directions opposite to each other.

The boom remote control valve 24 is a pilot valve that is arranged between the pilot pump 13 and the pair of pilot ports 21a, 21b. In FIG. 3, an illustration of a fluid passage connecting the pilot pump 13 and the boom remote control valve 24 is omitted.

When the boom manipulating lever 23 is not operated and is placed at a neutral position, the boom remote control valve 24 is closed to block the flow of the hydraulic fluid in the fluid passage between the pilot pump 13 and the pair of pilot ports 21a, 21b. On the other hand, when one of the boom raising manipulation and the boom lowering manipulation is applied to the boom manipulating lever 23, the boom remote control valve 24 is opened in such a manner as to permit the input of a pilot pressure commensurate with the manipulation amount of the one manipulation from the pilot pump 13 to one of the pair of pilot ports 21a and 21b of the boom control valve 21 that corresponds to a direction of the one manipulation.

The slewing motor 10 is a hydraulic motor that operates to slew the upper slewing body 2 upon receiving a supply of the hydraulic fluid discharged from the second hydraulic pump 12. The slewing motor 10 has an unillustrated output shaft that rotates upon receiving the supply of the hydraulic fluid discharged from the second hydraulic pump 12, and the output shaft is connected to the upper slewing body 2 to slew the upper slewing body 2 to both the directions or leftward and rightward. Specifically, the slewing motor 10 has a first port 10a and a second port 10b, receives the supply of the hydraulic fluid at one of the ports to rotate the output shaft in a direction corresponding to the one port, and discharge the hydraulic fluid from the other port.

The slewing control device 30 controls, in response to a slewing manipulation causing the upper slewing body 2 to slew, the direction and flow rate of the hydraulic fluid supplied from the second hydraulic pump 12 to the slewing motor 10. The slewing control device 30 includes a slewing control valve 31 and a slewing manipulating device 32.

The slewing control valve 31 is arranged between the second hydraulic pump 12 and the slewing motor 10. The slewing control valve 31 selectively directs the hydraulic fluid used to drive the slewing motor 10 from the second hydraulic pump 12 to either the first port 10a or the second port 10b of the slewing motor 10, and controls a slewing flow rate meaning a flow rate of the hydraulic fluid supplied to the slewing motor 10. The slewing control valve 31 is a three-position pilot switch valve, and has a pair of slewing pilot ports 31a, 31b.

When the pilot pressures supplied to the pair of slewing pilot ports 31a, 31b are zero or minute, the slewing control valve 31 is kept at a neutral position, and blocks the flow of the hydraulic fluid in a fluid passage between the second hydraulic pump 12 and the slewing motor 10. The fluid passage between the second hydraulic pump 12 and the slewing control valve 31 is provided with an unillustrated relief valve.

When a certain pilot pressure or more is supplied to one of the pair of slewing pilot ports 31a, 31b, the slewing control valve 31 shifts from the neutral position to a direction corresponding to the slewing pilot port in a stroke commensurate with a magnitude of the pilot pressure. This causes the slewing motor 10 to operate in a direction and at a speed corresponding the stroke.

The slewing manipulating device 32 operates, in response to a slewing manipulation causing the upper slewing body 2 to slew, in such a manner as to permit that the pilot pressure corresponding to the slewing manipulation is selectively supplied from the pilot pump 13 to either one of the pair of slewing pilot ports 31a, 31b of the slewing control valve 31.

Specifically, the slewing manipulating device 32 includes a slewing manipulating lever 33 and a slewing remote control valve 34.

The slewing manipulating lever 33 is a member rotatable in response to the slewing manipulation by an operator.

The slewing remote control valve 34 is a pilot valve arranged between the pilot pump 13 and the pair of slewing pilot ports 31a, 31b. In FIG. 3, an illustration of a fluid passage connecting the pilot pump 13 and the slewing remote control valve 34 is omitted.

When the slewing manipulating lever 33 is not operated and is placed at a neutral position, the slewing remote control valve 34 is closed to block the flow of the hydraulic fluid in the fluid passage between the pilot pump 13 and the pair of slewing pilot ports 31a, 31b. On the other hand, when the slewing manipulation is applied to the slewing manipulating lever 33, the slewing remote control valve 34 is opened in such a manner as to permit the input of a pilot pressure commensurate with the slewing manipulation from the pilot pump 13 to one of the pair of slewing pilot ports 31a, 31b of the slewing control valve 31 that corresponds to a direction of the slewing manipulation.

The confluence switch valve 40 is configured to be switchable between a permission state of permitting a confluence of at least a part of the hydraulic fluid discharged from the second hydraulic pump 12 with the hydraulic fluid supplied from the first hydraulic pump 11 to the bottom chamber 7a of the boom cylinder 7 and a suspension state of suspending the confluence of the hydraulic fluid discharged from the second hydraulic pump 12 with the hydraulic fluid supplied from the first hydraulic pump 11 to the bottom chamber 7a of the boom cylinder 7.

The confluence switch valve 40 is configured to direct the hydraulic fluid used to accelerate the movement of the boom 4 in the rising direction, in addition to the hydraulic fluid supplied from the first hydraulic pump 11 to the bottom chamber 7a of the boom cylinder 7, from the second hydraulic pump 12 to the bottom chamber 7a of the boom cylinder 7, and to regulate the flow rate of the hydraulic fluid.

The confluence switch valve 40 is a two-position pilot switch valve, and has one acceleration pilot port 40a. When the pilot pressure supplied to the acceleration pilot port 40a is zero or minute, the confluence switch valve 40 is kept at a neutral position, and blocks the flow of the hydraulic fluid in a fluid passage between the second hydraulic pump 12 and the boom cylinder 7. When a certain pilot pressure or more is supplied to the acceleration pilot port 40a, the confluence switch valve 40 shifts from the neutral position to a boom raising acceleration position in a stroke commensurate with a magnitude of the pilot pressure. This allows at least a part of the hydraulic fluid from the second hydraulic pump 12 to flow, at a flow rate corresponding to the stroke, together with the hydraulic fluid supplied from the first hydraulic pump 11 to the bottom chamber 7a, to be thereby supplied to the bottom chamber 7a of the boom cylinder 7. This accelerates the drive of the boom cylinder 7 in the boom raising direction (rising direction) with an intensity commensurate with the stroke.

The confluence pilot valve 80 includes, for example, a solenoid valve (e.g., a proportional pressure reducing valve or an inversely proportional pressure reducing valve) having a solenoid 80a, and is configured to reduce the pressure of the hydraulic fluid discharged from the pilot pump 13 to a pressure corresponding to an instruction signal (electric signal) input to the solenoid 80a, and to input the reduced pressure to the acceleration pilot port 40a of the confluence switch valve 40.

The arm cylinder 8 shown in FIG. 1 is a hydraulic actuator that operates to raise and lower the arm 5 upon receiving a supply of hydraulic fluid discharged from the second hydraulic pump 12. The leading end attachment cylinder 9 shown in FIGS. 1 and 3 is hydraulic actuator that operates to swing the leading end attachment upon receiving a supply of hydraulic fluid discharged from the first hydraulic pump 11.

The arm control device is a device adapted for operating the arm 5. In FIG. 3, an illustration of the arm control device is omitted.

The leading end attachment control device 70 is a device adapted for operating a leading end attachment such as the bucket 6. The leading end attachment control device 70 controls, in response to a leading end attachment manipulation causing the leading end attachment included in the working device 3 to swing, a direction and a flow rate of hydraulic fluid supplied from the first hydraulic pump 11 to the leading end attachment cylinder 9. The leading end attachment control device 70 includes a leading end attachment control valve 71 and a leading end attachment manipulating device 72.

The leading end attachment control valve 71 is arranged between the first hydraulic pump 11 and the leading end attachment cylinder 9, and is opened and closed in such a manner as to change the direction and the flow rate of the hydraulic fluid supplied from the first hydraulic pump 11 to the leading end attachment cylinder 9. Specifically, the leading end attachment control valve 71 includes three position direction change valve of a pilot operation type including a pair of pilot ports 71a, 71b.

When no pilot pressure is input to the pair of pilot ports 71a, 71b, the leading end attachment control valve 71 is kept at a neutral position, and blocks the flow of the hydraulic fluid in a fluid passage between the first hydraulic pump 11 and the leading end attachment cylinder 9. The fluid passage between the first hydraulic pump 11 and the leading end attachment control valve 71 is provided with an unillustrated relief valve.

When a pilot pressure is input to either one of the pair of pilot ports 71a, 71b, the leading end attachment control valve 71 shifts from the neutral position in a stroke commensurate with a magnitude of the pilot pressure to be thereby opened in such a manner as to permit the supply of the hydraulic fluid from the first hydraulic pump 11 to one of the bottom chamber 9a and the rod chamber 9b of the leading end attachment cylinder 9 at a flow rate corresponding to the stroke, and the discharge of the hydraulic fluid from the other of the bottom chamber 9a and the rod chamber 9b of the leading end attachment cylinder 9. This drives the leading end attachment cylinder 9 at a speed corresponding to the pilot pressure.

The leading end attachment manipulating device 72 operates, in response to an attachment manipulation causing the leading end attachment to operate, in such a manner as to permit the input of the pilot pressure corresponding to the attachment manipulation from the pilot pump 13 to the leading end attachment control valve 71.

Specifically, the leading end attachment manipulating device 72 includes a leading end attachment manipulating lever 73 and a leading end attachment remote control valve 74.

The leading end attachment manipulating lever 73 is a member rotatable in response to the attachment manipulation by an operator.

The leading end attachment remote control valve 74 is a pilot valve arranged between the pilot pump 13 and the pair of pilot ports 71a, 71b. In FIG. 3, an illustration of a fluid passage connecting the pilot pump 13 and the leading end attachment remote control valve 74 is omitted.

When the leading end attachment manipulating lever 73 is not operated and is placed at a neutral position, the leading end attachment remote control valve 74 is closed to block the flow of the hydraulic fluid in the fluid passage between the pilot pump 13 and the pair of pilot ports 71a, 71b. On the other hand, when the attachment manipulation is applied to the leading end attachment manipulating lever 73, the leading end attachment remote control valve 74 is opened in such a manner as to permit the input of a pilot pressure commensurate with the manipulation amount of the attachment manipulation from the pilot pump 13 to one of the pair of pilot ports 71a, 71b of the leading end attachment control valve 71 that corresponds to a direction of the attachment manipulation.

The boom operating pressure detection part 41 detects a boom operating pressure corresponding to an operating pressure of the boom cylinder 7. In this embodiment, as the boom operating pressure detection part 41, there is provided a pressure sensor 41 capable of detecting a pressure in the bottom chamber 7a of the boom cylinder 7. The boom operating pressure detection part 41 detects a pressure in a fluid passage between the boom control valve 21 and the bottom chamber 7a of the boom cylinder 7. Specifically, the boom operating pressure detection part 41 may detect, for example, a pressure in the fluid passage at a position between a portion connected with a secondary side fluid passage of the confluence switch valve 40 and the bottom chamber 7a. The boom operating pressure detection part 41 generates a boom operating pressure detection signal corresponding to the pressure in the bottom chamber 7a of the boom cylinder 7. The boom operating pressure detection signal is input to the controller 50.

As the boom operating pressure detection part 41, there may be provided, for example, a pressure sensor 46 capable of detecting a discharge pressure of the first hydraulic pump 11. The pressure sensor 46 may detect, for example, a pressure in a fluid passage connecting the first hydraulic pump 11 and the boom control valve 21 at a position between a portion connected with a primary side fluid passage of the leading end attachment control valve 71 and the first hydraulic pump 11.

The slewing operating pressure detection part 42 detects a slewing operating pressure corresponding to an operating pressure of the slewing motor 10. In this embodiment, as the slewing operating pressure detection part 42, there is provided a pressure sensor 42 capable of detecting the slewing operating pressure. Specifically, the slewing operating pressure detection part 42 is arranged in the hydraulic circuit, for example, at a position allowing the detection of a discharge pressure of the second hydraulic pump 12. The slewing operating pressure detection part 42 may detect, for example, a pressure in a fluid passage between the second hydraulic pump 12 and the slewing control valve 31. More specifically, the slewing operating pressure detection part 42 may detect, for example, a pressure in the fluid passage at a position between a portion connected with a primary side fluid passage of the confluence switch valve 40 and the second hydraulic pump 12. The slewing operating pressure detection part 42 generates a slewing operating pressure detection signal corresponding to the slewing operating pressure. The slewing operating pressure detection signal is input to the controller 50.

As the slewing operating pressure detection part 42, there may be provided, for example, a pair of pressure sensors capable of detecting a motor pressure difference in the slewing motor 10. In this case, one of the pair of pressure sensors detects, for example, a pressure in a fluid passage connecting the first port 10a of the slewing motor 10 and the slewing control valve 31, and the other of the pair of pressure sensors detects, for example, a pressure in a fluid passage connecting the second port 10b of the slewing motor 10 and the slewing control valve 31.

As the boom raising manipulation detection part 43, there may be provided, for example, a sensor for detecting that the boom raising manipulation is applied to the boom control device 20. In this embodiment, as the boom raising manipulation detection part 43, there is provided, for example, a pressure sensor for detecting a pilot pressure (a boom raising pilot pressure) input from the boom remote control valve 24 to the pilot port 21a of the boom control valve 21. The boom raising manipulation detection part 43 generates a boom raising pilot pressure detection signal corresponding to the boom raising pilot pressure. The boom raising pilot pressure detection signal is input to the controller 50.

As the slewing manipulation detection part 44, there may be provided, for example, a sensor for detecting that the slewing manipulation is applied to the slewing control device 30. In this embodiment, as the slewing manipulation detection part 44, there are provided, for example, a pair of pressure sensors 44A, 44B for detecting the respective pilot pressures (slewing pilot pressures) input from the slewing remote control valve 34 to the pair of slewing pilot ports 31a, 31b of the slewing control valve 31. Each of the pair of pressure sensors 44A, 44B generates a slewing pilot pressure detection signal corresponding to a slewing pilot pressure. The slewing pilot pressure detection signal is input to the controller 50.

As the leading end attachment manipulation detection part 45, there may be provided, for example, a sensor for detecting that the attachment manipulation is applied to the leading end attachment control device 70. In this embodiment, as the leading end attachment manipulation detection part 45, there are provided, for example, a pair of pressure sensors 45A, 45B for detecting the respective pilot pressures (leading end attachment pilot pressures) input from the leading end attachment remote control valve 74 to the pair of pilot ports 71a, 71b of the leading end attachment control valve 71. Each of the pair of pressure sensors 45A, 45B generates a leading end attachment pilot pressure detection signal corresponding to a leading end attachment pilot pressure. The leading end attachment pilot pressure detection signal is input to the controller 50.

The controller 50 includes, for example, a computer including a CPU, memory, and the like. The controller 50 includes a confluence control part 51, a pump capacity control part 52, and a storage part 53.

The confluence control part 51 controls the confluence switch valve 40 to be in the permission state when the non-slewing and boom raising manipulation action, in which the boom raising manipulation is applied to the boom control device 20 and the slewing manipulation is not applied to the slewing control device 30, is performed. The confluence control part 51 controls the confluence switch valve 40 to be in the suspension state when the slewing and boom raising manipulation action, in which the boom raising manipulation is applied to the boom control device 20 and the slewing manipulation is concurrently applied to the slewing control device 30, is performed.

For example, the non-slewing and boom raising manipulation action may include a boom single manipulation action in which only the boom raising manipulation is performed. The non-slewing and boom raising manipulation action may include a combined manipulation action in which the boom raising manipulation and a manipulation for actuating the arm 5 are concurrently performed. The non-slewing and boom raising manipulation action may include a combined manipulation action in which the boom raising manipulation and a manipulation for actuating the leading end attachment are concurrently performed. The non-slewing and boom raising manipulation action may include a combined manipulation action in which the boom raising manipulation and a manipulation for actuating a travelling device of the lower travelling body 1 are concurrently performed. Here, the non-slewing and boom raising manipulation action is not required to include the single manipulation action and all the combined manipulation actions, but may be enough to include only a part of the manipulation actions.

In this embodiment, when the non-slewing and boom manipulation action is performed, the controller 50 does not receive an input of the slewing pilot pressure detection signal from the slewing manipulation detection part 44, but receives an input of the boom raising pilot pressure detection signal from the boom raising manipulation detection part 43. In this case, the confluence control part 51 controls the confluence switch valve 40 to be in the permission state. Specifically, the confluence control part 51 outputs an instruction signal corresponding to the boom raising pilot pressure detection signal. The instruction signal is input to the solenoid 80a of the confluence pilot valve 80. Accordingly, the pressure of the hydraulic fluid discharged from the pilot pump 13 is reduced to a pilot pressure corresponding to the boom raising pilot pressure detection signal at the confluence pilot valve 80, and the pilot pressure is input to the acceleration pilot port 40a of the confluence switch valve 40. When the pilot pressure is input, the confluence switch valve 40 shifts from the neutral position to the boom raising acceleration position in a stroke commensurate with a magnitude of the pilot pressure. This allows at least a part of the hydraulic fluid from the second hydraulic pump 12 to be supplied to the bottom chamber 7a of the boom cylinder 7 at a flow rate corresponding to the stroke, to thereby flow together with the hydraulic fluid supplied from the first hydraulic pump 11 to the bottom chamber 7a.

Alternatively, when the slewing and boom manipulation action is performed, the controller 50 receives an input of the boom raising pilot pressure detection signal from the boom raising manipulation detection part 43, and concurrently receives an input of the slewing pilot pressure detection signal from the slewing manipulation detection part 44. In this case, the confluence control part 51 controls the confluence switch valve 40 to be in the suspension state. Specifically, the confluence control part 51 controls the confluence pilot valve 80 in such a manner as not to supply a certain pilot pressure or more to the acceleration pilot port 40a of the confluence switch valve 40. More specifically, in a case where there is provided an inversely proportional valve as the confluence pilot valve 80, the confluence control part 51 inputs to the solenoid 80a of the confluence pilot valve 80 an instruction signal that instructs not to supply a certain pilot pressure or more to the acceleration pilot port 40a. Accordingly, no hydraulic fluid discharged from the pilot pump 13 is input to the acceleration pilot port 40a of the confluence switch valve 40. Therefore, the confluence switch valve 40 is placed at the neutral position (in the suspension state). Consequently, the hydraulic fluid discharged from the second hydraulic pump 12 neither flows together with the hydraulic fluid supplied from the first hydraulic pump 11 to the bottom chamber 7a nor is supplied to the bottom chamber 7a of the boom cylinder 7.

As described above, in this embodiment, when the non-slewing and boom raising manipulation action is performed, the confluence switch valve 40 is placed in the permission state, which permits a confluence of at least a part of the hydraulic fluid discharged from the second hydraulic pump 12 with the hydraulic fluid supplied from the first hydraulic pump 11 to the boom cylinder 7. Consequently, the boom raising operation is accelerated. On the other hand, when the slewing and boom raising manipulation action is performed, the confluence switch valve 40 is placed in the suspension state, and the hydraulic fluid discharged from the second hydraulic pump 12 is thus kept from joining the hydraulic fluid supplied from the first hydraulic pump 11 to the boom cylinder 7. In other words, when the slewing and boom raising manipulation action is performed, a circuit connecting the second hydraulic pump 12 and the slewing motor 10 is isolated from a circuit connecting the first hydraulic pump 11 and the boom cylinder 7. This makes it possible to reduce the influence of the operating pressure of the boom cylinder 7 on the operation of the slewing motor 10 when the slewing and boom raising manipulation action is performed, even in a case where the leading end attachment is replaced with a leading end attachment having a weight different therefrom.

When the slewing and boom raising manipulation action is performed, the pump capacity control part 52 performs the following capacity control on the basis of an operating pressure difference resulting from the subtraction of the slewing operating pressure detected by the slewing operating pressure detection part 42 from the boom operating pressure detected by the boom operating pressure detection part 41. The capacity control includes a control of regulating a pump capacity of the first hydraulic pump 11 (the first pump capacity) and a pump capacity of the second hydraulic pump 12 (the second pump capacity) respectively in such a manner that the first pump capacity increases and the second pump capacity decreases as the operating pressure difference increases, and a control of regulating the first pump capacity and the second pump capacity respectively in such a manner that the first pump capacity decreases and the second pump capacity increases as the operating pressure difference decreases.

Accordingly, this embodiment makes it possible that, when the slewing and boom raising manipulation action is performed, the hydraulic fluid is supplied from the first hydraulic pump 11 and the second hydraulic pump 12 to the boom cylinder 7 and the slewing motor 10 at flow rates responsive to the respective loads applied to the boom cylinder 7 and the slewing motor 10. This consequently facilitates the maintenance of a balance between the operation of the boom cylinder 7 and the operation of the slewing motor 10 when the slewing and boom raising manipulation action is performed.

Figure 5:
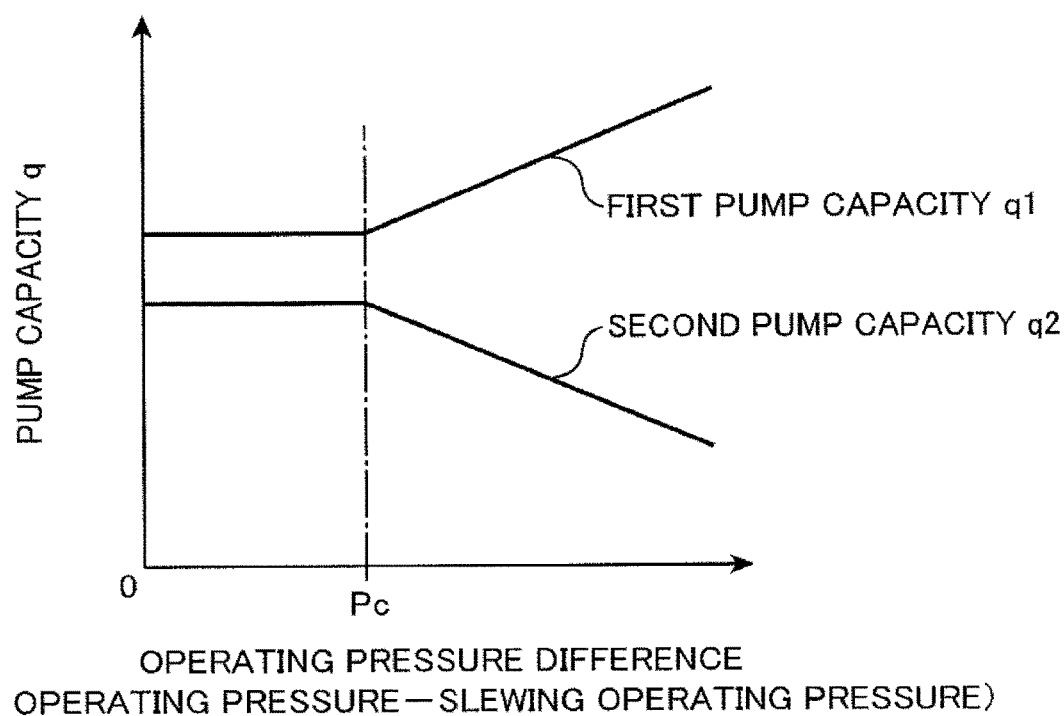
FIG. 5 is a graph showing an exemplary map stored in a storage part of the controller.

The storage part 53 stores a map representing a preset relationship between the operating pressure difference, the first pump capacity, and the second pump capacity. FIG. 5 is a graph showing an exemplary map stored in the storage part 53.

The pump capacity control part 52 outputs, in the capacity control, a first capacity instruction signal that is an electric signal for setting the first pump capacity to a pump capacity corresponding to the operating pressure difference in a map shown in FIG. 5, for example, and outputs a second capacity instruction signal that is an electric signal for setting the second pump capacity to a pump capacity corresponding to the operating pressure difference in the map. The first capacity instruction signal output from the pump capacity control part 52 is input to the first regulator 11A, whereby the first pump capacity is regulated to a capacity corresponding to the first capacity instruction signal. Similarly, the second capacity instruction signal output from the pump capacity control part 52 is input to the second regulator 12A, whereby the second pump capacity is regulated to a capacity corresponding to the second capacity instruction signal.

As described above, in this embodiment, the first pump capacity and the second pump capacity are respectively regulated according to an increase and a decrease in the operating pressure difference on the basis of the map when the slewing and boom raising manipulation action is performed. Therefore, the capacity control can be stably executed according to the map.

In this embodiment, the map shown in FIG. 5 is drawn such that each of the first pump capacity q1 and the second pump capacity q2 has a constant value in a region where the operating pressure difference is equal to or smaller than a preset value Pc. On the other hand, the map is drawn such that the first pump capacity q1 increases and the second pump capacity q2 decreases as the operating pressure difference increases in a region where the operating pressure difference is greater than the value Pc. Accordingly, in a case where the operating pressure difference is greater than Pc when the slowing and boom raising manipulation action is performed, the pump capacity control part 52 performs a control of regulating the first pump capacity q1 and the second pump capacity q2 respectively in such a manner that the first pump capacity q1 increases and the second pump capacity q2 decreases as the operating pressure difference increases, and a control of regulating the first pump capacity q1 and the second pump capacity q2 respectively in such a manner that the first pump capacity q1 decreases and the second pump capacity q2 increases as the operating pressure difference decreases. On the other hand, in a case where the operating pressure difference is equal to or smaller than Pc when the slewing and boom raising manipulation action is performed, the pump capacity control part 52 does not perform the above-described control even with an increase or a decrease in the operating pressure difference. Thus, each of the first pump capacity q1 and the second pump capacity q2 is maintained at a constant value. Advantages of using the map shown in FIG. 5 are described below.

The value Pc in the map shown in FIG. 5 may be determined substantially as specified below. In a case where the slewing and boom raising manipulation action is performed, the value Pc may be determined such that the region where the operating pressure difference is equal to or smaller than the value Pc substantially corresponds to a slewing acceleration state representing a state where the slewing operation of the upper slewing body 2 is accelerated, and the region where the operating pressure difference is greater than the value Pc substantially corresponds to a steady slew state representing a state where the slewing operation of the upper slewing body 2 is out of the slewing acceleration state (or a state approaching the steady slew state). In this case, the operating pressure difference is likely to be equal to or smaller than the value Pc for a duration of the slewing acceleration state (slewing acceleration duration) of the upper slewing body 2 in a time period from a time point at which the slewing and boom raising manipulation is started to a time point at which the slewing and boom raising manipulation is finished. Therefore, the use of the map shown in FIG. 5 can prevent an excessive reduction of the first pump capacity q1 for the duration of the slewing acceleration. Consequently, the configuration can prevent an occurrence of a situation in which the operation of the boom cylinder slows down excessively for the duration of the slewing acceleration.

Figure 6:
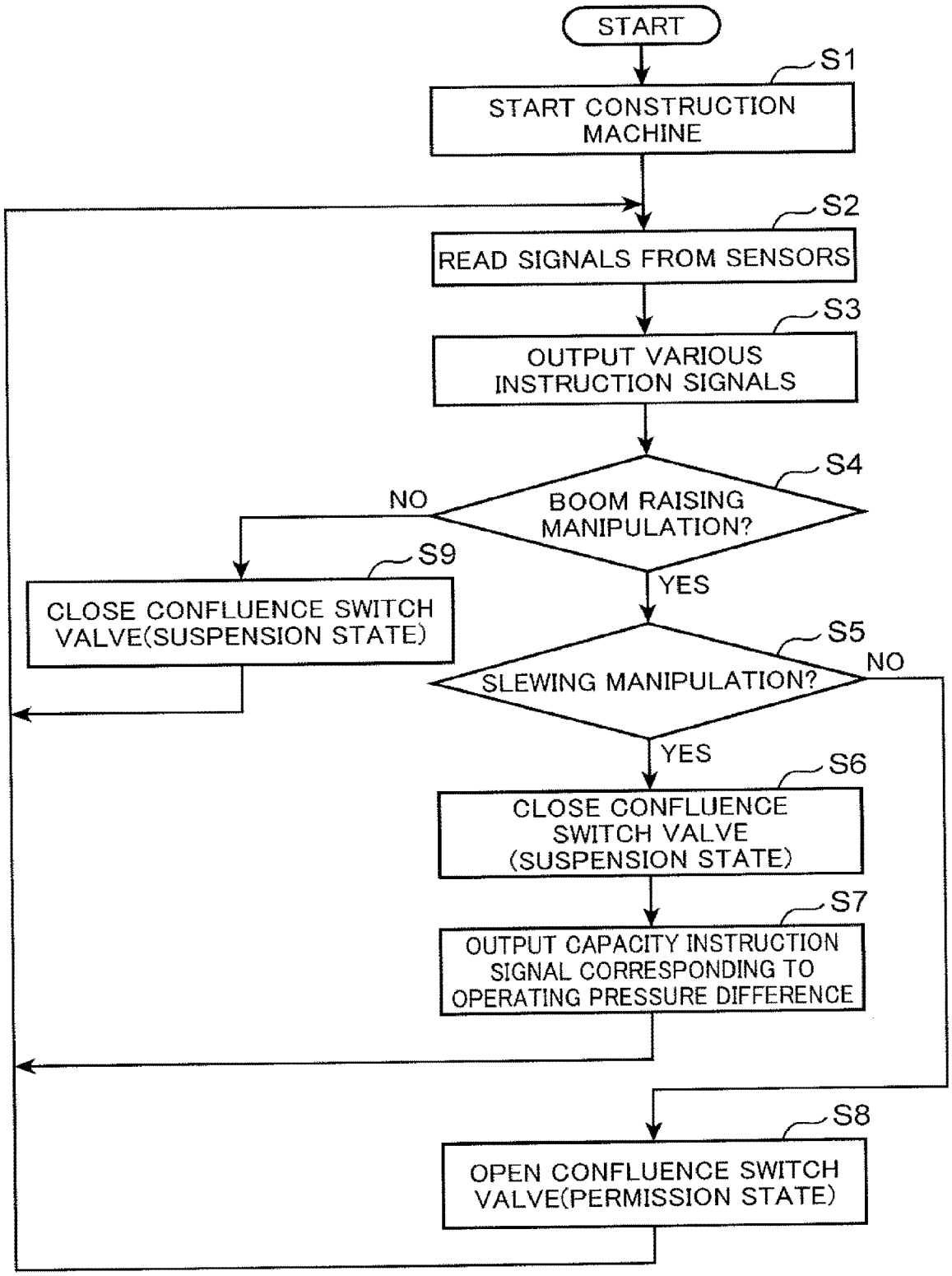
FIG. 6 is a flowchart showing an arithmetic control operation executed by the controller.

FIG. 6 is a flowchart showing an arithmetic control operation executed by the controller 50.

For example, the controller 50 starts the hydraulic excavator 100 upon receiving an input of a signal associated with a turn of a start key on by the operator in a cab of the hydraulic excavator 100 (Step S1).

Subsequently, the controller 50 reads various signals to be input from a plurality of sensors to the controller 50 (Step S2).

Thereafter, the controller 50 outputs various instruction signals to operate the hydraulic excavator 100 on the basis of various read signals (Step S3). Consequently, various operations are executed by the hydraulic excavator 100.

Subsequently, the confluence control part 51 of the controller 50 determines whether the boom raising manipulation is applied to the boom control device 20 (Step S4). Specifically, when no boom raising pilot pressure detection signal is input from the boom raising manipulation detection part 43 to the controller 50, the confluence control part 51 determines that the boom raising manipulation is not performed (NO in Step S4), and outputs, to a solenoid 80a of the confluence pilot valve 80, an instruction signal that instructs not to supply the pilot pressure to the acceleration pilot port 40a. Consequently, no hydraulic fluid discharged from the pilot pump 13 is input to the acceleration pilot port 40a of the confluence switch valve 40. The confluence switch valve 40 is thus placed at the neutral position, i.e., in the suspension state (Step S9).

On the other hand, when the boom raising pilot pressure detection signal is input from the boom raising manipulation detection part 43 to the controller 50, the confluence control part 51 determines that the boom raising manipulation is performed (YES in Step S4).

Subsequently, the confluence control part 51 determines whether the slewing manipulation is applied to the slewing control device 30 (Step S5). Specifically, when no slewing pilot pressure detection signal is input from the slewing manipulation detection part 44 to the controller 50, the confluence control part 51 determines that the slewing manipulation is not performed (NO in Step S5).

In the case of NO in Step S5, the operator performs the non-slewing and boom raising manipulation action in which the boom raising manipulation is performed but the slewing manipulation is not performed. In this case, the confluence control part 51 outputs the instruction signal corresponding to the boom raising pilot pressure detection signal. The instruction signal is input to the solenoid 80a of the confluence pilot valve 80. Consequently, the pressure of the hydraulic fluid discharged from the pilot pump 13 is reduced to a pilot pressure corresponding to the boom raising pilot pressure detection signal at the confluence pilot valve 80, and the pilot pressure is input to the acceleration pilot port 40a of the confluence switch valve 40. When the pilot pressure is input, the confluence switch valve 40 shifts from the neutral position to the boom raising acceleration position in a stroke commensurate with a magnitude of the pilot pressure. Specifically, the confluence switch valve 40 is switched to the permission state (Step S8).

On the other hand, when the slewing pilot pressure detection signal is input from the slewing manipulation detection part 44 to the controller 50, the confluence control part 51 determines that the slewing manipulation is performed (YES in Step S5).

In the case of YES in Step S5, the operator performs the slewing and boom raising manipulation action in which the boom raising manipulation is performed and the slewing manipulation is concurrently performed. In this case, the confluence control part 51 outputs to the solenoid 80a of the confluence pilot valve 80 the instruction signal that instructs not to supply the pilot pressure to the acceleration pilot port 40a. Consequently, no hydraulic fluid discharged from the pilot pump 13 is input to the acceleration pilot port 40a of the confluence switch valve 40. The confluence switch valve 40 is thus at the neutral position, i.e., in the suspension state (Step S6).

Subsequently, the pump capacity control part 52 of the controller 50 executes the capacity control on the basis of the operating pressure difference, i.e., a value obtained by subtracting the slewing operating pressure detected by the slewing operating pressure detection part 42 from the boom operating pressure detected by the boom operating pressure detection part 41. Specifically, the pump capacity control part 52 outputs a first capacity instruction signal for setting the first pump capacity to a pump capacity corresponding to the operating pressure difference in the map shown in FIG. 5, and outputs a second capacity instruction signal for setting the second pump capacity to a pump capacity corresponding to the operating pressure difference in the map (Step S7). Accordingly, the first pump capacity is regulated to a capacity corresponding to the first capacity instruction signal, and the second pump capacity is regulated to a capacity corresponding to the second capacity instruction signal.

FIG. 7 is a block diagram showing a configuration of the controller 50 connected to a hydraulic circuit in a hydraulic excavator which is a modification of the embodiment. FIG. 8 is a graph showing an exemplary map stored in a storage part 53 of the controller 50 in the modification.

The modified hydraulic excavator differs from the hydraulic excavator 100 according to the embodiment described above with reference to FIGS. 1 to 6 in that it further includes a leading end attachment determination part having an image taking device 47 and an image determination section 54 as shown in FIG. 7. Further, the modified hydraulic excavator differs from the hydraulic excavator 100 according to the embodiment described above with reference to FIGS. 1 to 6 in that the storage part 53 stores a plurality of maps as shown in FIG. 8. Hereinafter, the differences will be mainly described. Apart from the differences, the configuration of the modified hydraulic excavator is the same as the configuration of the hydraulic excavator 100 according to the embodiment shown in FIGS. 1 to 6.

The image taking device 47 acquires a site image that is an image of a work site where the hydraulic excavator 100 works. The site image is an image including at least the leading end attachment (the leading end attachment actually included in the working device 3). Image data acquired by the image taking device 47 is input to the controller 50.

The image determination section 54 determines, on the basis of the image data input to the controller 50, which leading end attachment among the leading end attachments 6, 6A, 6B, 6C, and 6D is actually included in the working device 3. The image determination section 54 may determine the leading end attachment included in the working device 3 by detecting the leading end attachment included in the image through, for example, Template Matching. Further, the image determination section 54 may determine which leading end attachment among the leading end attachments 6, 6A, 6B, 6C, and 6D coincides with the leading end attachment included in the site image by inputting the image data to a multilayered neural network machine-learned through Deep Learning. Further, the image determination section 54 may determine the leading end attachment included in the working device 3 on the basis of a marker for recognition disposed in advance on each of the leading end attachments.

In the modification, a map is individually drawn in advance for each of the leading end attachments 6, 6A, 6B, 6C, and 6D as shown in FIG. 8. In the embodiment shown in FIG. 8, for example, the maps respectively corresponding to the leading end attachments 6, 6A, 6B, 6C, and 6D are drawn such that a straight line representing a relationship between the operating pressure difference and the first pump capacity q1 has a gradient smaller as the weight of the leading end attachment increases. Further, the maps are drawn such that a straight line representing a relationship between the operating pressure difference and the second pump capacity q2 has a gradient greater (i.e., such that the gradient denoting a negative value has a smaller absolute value) as the weight of the leading end attachment increases.

When the upper slewing body 2 reaches the steady slew state while the slewing and boom raising manipulation action is performed, the slewing operating pressure decreases. Therefore, when the working device 3 includes a leading end attachment having a large weight, the operating pressure difference is liable to increase. Therefore, the modification including the maps drawn as shown in FIG. 8 can prevent an occurrence of a situation where the second pump capacity excessively decreases due to an increase in the operating pressure difference caused by a leading end attachment having a relatively large weight selectively mounted among the leading end attachments when the upper slewing body 2 reaches the steady slew state.

The maps are not limited to the specific one shown in FIG. 8, but may be properly drawn in such a manner as to prevent a change in the balance between an operation of a slewing motor and an operation of a boom cylinder when the slewing and boom raising manipulation action is performed due to a variation in the weight of the working device. For example, when the upper slewing body 2 reaches the steady slew state and the slewing operating pressure decreases, a restriction for a horsepower control (horsepower limiting control) is likely to be relieved, consequently increasing, in this case, a degree of freedom in the setting of a map. Besides, a work content is variable depending on the type of the leading end attachment. Therefore, the maps may be drawn in consideration of these factors.

In the modification, the pump capacity control part 52 outputs the capacity instruction signals for setting the first pump capacity and the second pump capacity to respective pump capacities corresponding to the operating pressure difference on the basis of the map that corresponds to the leading end attachment determined, among the maps, by the image determination section 54.

The modification, in which a map is drawn for each of the leading end attachments having different weights from one another, enables a more finely calibrated capacity control optimal for a weight of each of the leading end attachments. Additionally, in the modification, the leading end attachment actually included in the working device 3 is determined by the leading end attachment determination part. Therefore, for example, the leading end attachment can be identified through the determination by the leading end attachment determination part without requiring the operator of the hydraulic excavator 100 to perform an input work for identifying the leading end attachment included in the working device 3. This enables a reduction of burden on the operator.

The present invention is not limited to the embodiments described above. The present invention may include the following configurations, for example.

(A) Slewing-Type Construction Machine

In the embodiments, the slewing-type construction machine is the hydraulic excavator 100, but it is not limited thereto. This invention may be applicable to a wide range of construction machines which include an upper slewing body slewably mounted on a base body and utilize hydraulic fluid as a main drive power. The base body is not limited to the self-propellable one, e.g., a lower travelling body of the hydraulic excavator 100, but may be a member fixedly attached to the ground or a structure.

(B) Map

In the embodiment, the map is drawn such that each of the first pump capacity q1 and the second pump capacity q2 has a constant value in a region where the operating pressure difference is equal to or smaller than a preset value Pc as shown in FIG. 5, but is not limited to this configuration. The map may be drawn such that the first pump capacity q1 increases and the second pump capacity q2 decreases as the operating pressure difference increases in the region where the operating pressure difference is equal to or smaller than the preset value Pc as well.

Further, in the embodiment, the map is drawn such that the first pump capacity q1 is larger than the second pump capacity q2 in the region where the operating pressure difference is equal to or smaller than the preset value Pc as shown in FIG. 5, but is not limited to this configuration. The map may be drawn such that the first pump capacity q1 is smaller than the second pump capacity q2, or such that the first pump capacity q1 has the same value as the second pump capacity q2 in the region where the operating pressure difference is equal to or smaller than the preset value Pc.

Further, in the embodiment, the map is drawn such that the relationship (characteristics) between the operating pressure difference, the first pump capacity q1, and the second pump capacity q2 is represented by a straight line as shown in FIG. 5, but is not limited to this configuration, and may be properly drawn according to characteristics of a target construction machine. For example, the map may be drawn such that the relationship (characteristics) between the operating pressure difference, the first pump capacity q1, and the second pump capacity q2 is represented by a curve, or such that the relationship (characteristics) is represented by a combination of a straight line and a curve.

Further, in the modification shown in FIG. 8, a map is individually drawn for each of the leading end attachments 6, 6A, 6B, 6C, and 6D, but the map is not limited to this configuration. For example, it may be also appreciated that a map (first map) representing a relationship between the operating pressure difference, the first pump capacity, and the second pump capacity in one leading end attachment (first leading end attachment) among the leading end attachments 6, 6A, 6B, 6C, and 6D is drawn in advance, and a map (second map) representing a relationship between the operating pressure difference, the first pump capacity, and the second pump capacity in another leading end attachment (second leading end attachment) among the leading end attachments 6, 6A, 6B, 6C, and 6D is drawn in advance. In this case, for the other remaining leading end attachments among the leading end attachments 6, 6A, 6B, 6C, and 6D, a map is not particularly required to be drawn, and the first map or the second map may be used.

(C) Leading End Attachment Determination Part

In the embodiment, the leading end attachment determination part includes the image taking device 47 and the image determination section 54, but is not limited to this configuration. The leading end attachment determination part may include, for example, a reception section for receiving an input by the operator of the construction machine for identifying the leading end attachment included in the working device, and an input information determination section for determining on the basis of the input information received by the reception section which of the leading end attachments is included.

(D) Confluence Pilot Valve

The slewing-type construction machine according to the embodiment includes the confluence pilot valve 80 (solenoid valve). Here, the confluence pilot valve 80 is not essential, but is omittable. In a case of the omission of the confluence pilot valve 80, when the boom raising manipulation is applied to the boom manipulating lever 23, a pilot pressure from the boom remote control valve 24 may be input to the acceleration pilot port 40*a* of the confluence switch valve 40. In this case, there may be provided, between the boom remote control valve 24 and the acceleration pilot port 40*a* of the confluence switch valve 40, a control valve switchable between a permission state of permitting an input of a pilot pressure from the boom remote control valve 24 to the acceleration pilot port 40*a* of the confluence switch valve 40 and a suspension state of suspending the input of the pilot pressure. It may be appreciated that the control valve is placed in the permission state when no pilot pressure is input from the slewing remote control valve 34, i.e., when the non-slewing and boom raising manipulation action is performed, and the control valve is switched to the suspension state when a pilot pressure is input from the slewing remote control valve 34, i.e., when the slewing and boom raising manipulation action is performed. This modification enables a cost reduction owing to the omission of the solenoid valve.

(E) Boom Control Device and Stewing Control Device

In the embodiment, the boom control device and the slewing control device include hydraulic control devices (hydraulic operation devices), but are not limited thereto, and may include electric control devices (electric operation devices). Specifically, in the embodiment including a hydraulic control device, when the manipulating levers 23, 33 are manipulated, primary pilot pressures from the pilot pump 13 are reduced according to respective manipulation amounts of the manipulating levers, and the reduced pilot pressures are thus output from the remote control valves 24, 34. The output pilot pressures are input to the pilot ports of the control valves 21, 31. In an electric control device, the respective manipulation amounts of the manipulating levers 23, 33 are converted into electric signals, and are input to the controller 50. The controller 50 inputs instruction currents commensurate with the respective operation amounts to proportional solenoid valves. The proportional solenoid valves are arranged between the pilot pump 13 and a pair of pilot ports of each of the control valves 21, 31. The proportional solenoid valves allows pilot pressures corresponding to the instruction currents to flow to the pilot ports.

As described above, according to the present disclosure, there is provided a slewing-type construction machine that can keep the balance between an operation of a slewing motor and an operation of a boom cylinder from changing when a slewing and boom raising manipulation action is performed, irrespective of a change in the weight of a working device caused by a replacement of a leading end attachment.

A slewing-type construction machine to be provided includes: a base body; an upper slewing body slewably mounted on the base body; a working device including a boom tiltably connected to the upper slewing body, and a leading end attachment that is selected from a plurality of leading end attachments having different weights from one another; a first hydraulic pump having a variable capacity for discharging hydraulic fluid; a second hydraulic pump having a variable capacity for discharging hydraulic fluid; a boom cylinder receiving a supply of the hydraulic fluid discharged from the first hydraulic pump to raise and lower the boom; a boom control device, in response to a boom raising manipulation causing the boom to move in a rising direction, controlling a flow rate of the hydraulic fluid supplied from the first hydraulic pump to the boom cylinder; a slewing motor receiving a supply of the hydraulic fluid discharged from the second hydraulic pump to slew the upper slewing body; a slewing control device, in response to a slewing manipulation causing the upper slewing body to slew, controlling a direction and a flow rate of the hydraulic fluid supplied from the second hydraulic pump to the slewing motor; a confluence switch valve switchable between a permission state of permitting a confluence of at least a part of the hydraulic fluid discharged from the second hydraulic pump with the hydraulic fluid supplied from the first hydraulic pump to the boom cylinder and a suspension state of suspending the confluence of the hydraulic fluid; a boom operating pressure detection part for detecting a boom operating pressure corresponding to an operating pressure of the boom cylinder; a slewing operating pressure detection part for detecting a slewing operating pressure corresponding to an operating pressure of the slewing motor; a confluence control part for controlling the confluence switch valve to be in the permission state when a non-slewing and boom raising manipulation action in which the boom raising manipulation is applied to the boom control device and the slewing manipulation is not applied to the slewing control device is performed, and controlling the confluence switch valve to be in the suspension state when a slewing and boom raising manipulation action in which the boom raising manipulation is applied to the boom control device and the slewing manipulation is concurrently applied to the slewing control device is performed; and a pump capacity control part for executing a capacity control when the slewing and boom raising manipulation action is performed, the capacity control including a control of regulating a first pump capacity meaning a pump capacity of the first hydraulic pump and a second pump capacity meaning a pump capacity of the second hydraulic pump respectively in such a manner that the first pump capacity increases and the second pump capacity decreases as an operating pressure difference resulting from the subtraction of the slewing operating pressure from the boom operating pressure increases, and a control of regulating the first pump capacity and the second pump capacity respectively in such a manner that the first pump capacity decreases and the second pump capacity increases as the operating pressure difference decreases.

In this slewing-type construction machine, the balance between an operation of the slewing motor and an operation of the boom cylinder can be kept from changing when the slewing and boom raising manipulation action is performed, irrespective of a change in the weight of the working device caused by a replacement of the leading end attachment. A specific explanation will be made below.

In the slewing-type construction machine, the confluence switch valve is set in the permission state when the non-slewing and boom raising manipulation action, in which the boom raising manipulation is performed but the slewing manipulation is not performed, is performed. Therefore, at least a part of hydraulic fluid discharged from the second hydraulic pump flows together with hydraulic fluid supplied from the first hydraulic pump to the boom cylinder. Consequently, the boom raising operation is accelerated. On the other hand, the confluence switch valve is set in the suspension state when the slewing and boom raising manipulation action is performed. Therefore, the hydraulic fluid discharged from the second hydraulic pump is kept from flowing together with the hydraulic fluid supplied from the first hydraulic pump to the boom cylinder. In other words, when the slewing and boom raising manipulation action is performed, a slewing motor side circuit being a circuit connecting the second hydraulic pump and the slewing motor is isolated from a boom cylinder side circuit being a circuit connecting the first hydraulic pump and the boom cylinder. This makes it possible to reduce the influence of the operating pressure of the boom cylinder on the operation of the slewing motor when the slewing and boom raising manipulation action is performed, even in a case where the leading end attachment is replaced with a leading end attachment having a weight different therefrom. Additionally, in the slewing-type construction machine, the following control is executed when the slewing and boom raising manipulation action is performed in order to facilitate the maintenance of a balance between an operation of the boom cylinder and an operation of the slewing motor when the slewing and boom raising manipulation action is performed. In other words, in the slewing-type construction machine, the first pump capacity and the second pump capacity are regulated on the basis of the operating pressure difference when the slewing and boom raising manipulation action is performed. Specifically, the first pump capacity and the second pump capacity are respectively regulated in such a manner that the first pump capacity increases and the second pump capacity decreases as the operating pressure difference increases, and in such a manner that the first pump capacity decreases and the second pump capacity increases as the operating pressure difference decreases. This makes it possible that the hydraulic fluid is supplied from the first pump and the second hydraulic pump to the boom cylinder and the slewing motor at flow rates responsive to the respective loads applied to the boom cylinder and the slewing motor. This consequently facilitates the maintenance of a balance between an operation of the boom cylinder and an operation of the slewing motor when the slewing and boom raising manipulation action is performed. As described above, in the slewing-type construction machine, the first pump capacity and the second pump capacity are regulated on the basis of the operating pressure difference upon separation of the slewing motor side circuit from the boom cylinder side circuit when the slewing and boom raising manipulation action is performed. Accordingly, the balance between an operation of the slewing motor and an operation of the boom cylinder can be kept from changing when the slewing and boom raising manipulation action is performed, irrespective of a change in the weight of the working device due to a replacement of the leading end attachment.

It is preferable that the slewing-type construction machine further includes a storage part for storing at least one map representing a preset relationship between the operating pressure difference, the first pump capacity, and the second pump capacity, and the pump capacity control part regulates, in the capacity control, the first pump capacity and the second pump capacity to respective pump capacities corresponding to the operating pressure difference using the at least one map.

In this configuration, the first pump capacity and the second pump capacity are respectively regulated according to an increase and a decrease in the operating pressure difference on the basis of the at least one preset map when the slewing and boom raising manipulation action is performed. This enables a stable execution of the capacity control according to the at least one map.

It may be appreciated that, in the slewing-type construction machine, the leading end attachments include a first leading end attachment and a second leading end attachment having different weights from one another, the at least one map includes a first map on the first leading end attachment representing a preset relationship between the operating pressure difference, the first pump capacity, and the second pump capacity, and a second map on the second leading end attachment representing a preset relationship between the operating pressure difference, the first pump capacity, and the second pump capacity, and the pump capacity control part executes the capacity control using the first map when the working device includes the first leading end attachment, and executes the capacity control using the second map when the working device includes the second leading end attachment.

In this configuration, a map is drawn for each of the first leading end attachment and the second leading end attachment having different weights from one another. This enables a more finely calibrated capacity control optimal for a weight of each of the first leading end attachment and the second leading end attachment.

It may be appreciated that the slewing-type construction machine further includes a leading end attachment determination part for determining which of the first leading end attachment and the second leading end attachment the working device includes, and the pump capacity control part executes the capacity control using either the first map or the second map that corresponds to a leading end attachment determined to be included in the working device by the leading end attachment determination part.

In this configuration, the leading end attachment actually included in the working device is determined by the leading end attachment determination part. Therefore, for example, the leading end attachment can be identified through the determination by the leading end attachment determination part without requiring the operator of the construction machine to perform an input work for identifying the leading end attachment included in the working device. This enables a reduction of burden on the operator.

It may be appreciated that, in the slewing-type construction machine, the leading end attachment determination part includes an image taking device for taking an image including the leading end attachment included in the working device, and an image determination section for determining, on the basis of the image taken by the image taking device, which of the first leading end attachment and the second leading end attachment is included.

In this configuration, the image determination section can determine the leading end attachment actually included in the working device on the basis of the image taken by the image taking device.

The invention claimed is:

1. A slewing-type construction machine, comprising:
a base body;
an upper slewing body slewably mounted on the base body;
a working device including a boom tiltably connected to the upper slewing body, and a leading end attachment that is selected from a plurality of leading end attachments having different weights from one another;
a first hydraulic pump having a variable capacity for discharging hydraulic fluid;
a second hydraulic pump having a variable capacity for discharging the hydraulic fluid;
a boom cylinder receiving a supply of the hydraulic fluid discharged from the first hydraulic pump to raise and lower the boom;
a boom control device, in response to a boom raising manipulation causing the boom to move in a rising direction, controlling a flow rate of the hydraulic fluid supplied from the first hydraulic pump to the boom cylinder;
a slewing motor receiving a supply of the hydraulic fluid discharged from the second hydraulic pump to slew the upper slewing body;
a slewing control device, in response to a slewing manipulation causing the upper slewing body to slew, controlling a direction and a flow rate of the hydraulic fluid supplied from the second hydraulic pump to the slewing motor;
a confluence switch valve switchable between a permission state of permitting a confluence of at least a part of the hydraulic fluid discharged from the second hydraulic pump with the hydraulic fluid supplied from the first hydraulic pump to the boom cylinder and a suspension state of suspending the confluence of the hydraulic fluid;
a boom operating pressure detection part for detecting a boom operating pressure corresponding to an operating pressure of the boom cylinder;
a slewing operating pressure detection part for detecting a slewing operating pressure corresponding to an operating pressure of the slewing motor;
a confluence control part for controlling the confluence switch valve to be in the permission state when a non-slewing and boom raising manipulation action in which the boom raising manipulation is applied to the boom control device and the slewing manipulation is not applied to the slewing control device is performed, and controlling the confluence switch valve to be in the suspension state when a slewing and boom raising manipulation action in which the boom raising manipulation is applied to the boom control device and the slewing manipulation is concurrently applied to the slewing control device is performed; and
a pump capacity control part for executing a capacity control when the slewing and boom raising manipulation action is performed, the capacity control including control of regulating a first pump capacity of the first hydraulic pump and a second pump capacity of the second hydraulic pump respectively in such a manner that the first pump capacity increases and the second pump capacity decreases as an operating pressure difference resulting from a subtraction of the slewing operating pressure from the boom operating pressure increases, and control of regulating the first pump capacity and the second pump capacity respectively in such a manner that the first pump capacity decreases and the second pump capacity increases as the operating pressure difference decreases.

2. The slewing-type construction machine according to claim 1, further comprising:
a storage part for storing at least one map representing a preset relationship between the operating pressure difference, the first pump capacity, and the second pump capacity, wherein
the pump capacity control part regulates, in the capacity control, the first pump capacity and the second pump capacity to respective pump capacities corresponding to the operating pressure difference using the at least one map.

3. The slewing-type construction machine according to claim 2, wherein
the plurality of leading end attachments includes a first leading end attachment and a second leading end attachment having different weights from one another,
the at least one map includes a first map on the first leading end attachment representing a preset relationship between the operating pressure difference, the first pump capacity, and the second pump capacity, and a second map on the second leading end attachment representing a preset relationship between the operating pressure difference, the first pump capacity, and the second pump capacity, and
the pump capacity control part executes the capacity control using the first map when the working device includes the first leading end attachment, and executes the capacity control using the second map when the working device includes the second leading end attachment.

4. The slewing-type construction machine according to claim 3, further comprising:
a leading end attachment determination part for determining which of the first leading end attachment and the second leading end attachment the working device includes, wherein
the pump capacity control part executes the capacity control using either the first map or the second map that corresponds to a leading end attachment determined to be included in the working device by the leading end attachment determination part.

5. The slewing-type construction machine according to claim 4, wherein
the leading end attachment determination part includes
an image taking device for taking an image including the leading end attachment included in the working device, and
an image determination section for determining, on the basis of the image taken by the image taking device, which of the first leading end attachment and the second leading end attachment is included.

* * * * *